(12) United States Patent
Shortz, Jr.

(10) Patent No.: US 9,399,390 B1
(45) Date of Patent: Jul. 26, 2016

(54) RETRACTABLE TARPAULIN FOR USE WITH A PICKUP TRUCK BED

(71) Applicant: Thomas Shortz, Jr., Wilkes Barre, PA (US)

(72) Inventor: Thomas Shortz, Jr., Wilkes Barre, PA (US)

( * ) Notice: Subject to any disclaimer, the term of this patent is extended or adjusted under 35 U.S.C. 154(b) by 0 days.

(21) Appl. No.: 14/629,623

(22) Filed: Feb. 24, 2015

(51) Int. Cl.
*B60J 7/10* (2006.01)
*B60J 7/08* (2006.01)
*B60J 7/20* (2006.01)

(52) U.S. Cl.
CPC ........ *B60J 7/085* (2013.01); *B60J 7/104* (2013.01); *B60J 7/20* (2013.01)

(58) Field of Classification Search
CPC ............... B60J 7/085; B60J 7/104; B60J 7/20
USPC .................... 296/98, 100.15, 100.16, 100.18
See application file for complete search history.

(56) References Cited

U.S. PATENT DOCUMENTS

| | | | | |
|---|---|---|---|---|
| 3,146,824 A | * | 9/1964 | Veilleux | B60J 7/085 160/23.1 |
| 3,806,185 A | | 4/1974 | Brandjord | |
| 4,563,034 A | * | 1/1986 | Lamb | B60J 7/068 160/266 |
| 4,784,427 A | * | 11/1988 | Burgess | B60J 7/068 160/314 |
| 4,792,178 A | * | 12/1988 | Kokx | B60P 7/04 160/266 |
| D352,024 S | | 11/1994 | Hebets | |
| D354,039 S | | 1/1995 | Kuoppala | |
| 5,605,369 A | | 2/1997 | Ruiz | |
| 5,697,664 A | | 12/1997 | Chenowth | |
| 5,758,921 A | * | 6/1998 | Hall | B60P 7/00 296/100.11 |
| 5,775,765 A | * | 7/1998 | Kintz | B60J 7/085 160/23.1 |
| 6,296,279 B1 | * | 10/2001 | Stoddard | B60J 11/06 280/770 |
| 6,527,318 B2 | | 3/2003 | Kolper | |
| 7,695,047 B2 | * | 4/2010 | Kohlstrand | B60J 7/067 296/100.01 |
| 2010/0123331 A1 | | 5/2010 | Bueina | |

* cited by examiner

*Primary Examiner* — Jason S Morrow
*Assistant Examiner* — E Turner Hicks
(74) *Attorney, Agent, or Firm* — Kyle A. Fletcher, Esq.

(57) ABSTRACT

The retractable tarpaulin for use with a pickup truck is an aramid fiber tarpaulin that can be used to protect the bed, shelter large loads, or provide a visible space for advertisements and other messages. The aramid fiber tarpaulin is set up and secured using magnets.

13 Claims, 4 Drawing Sheets

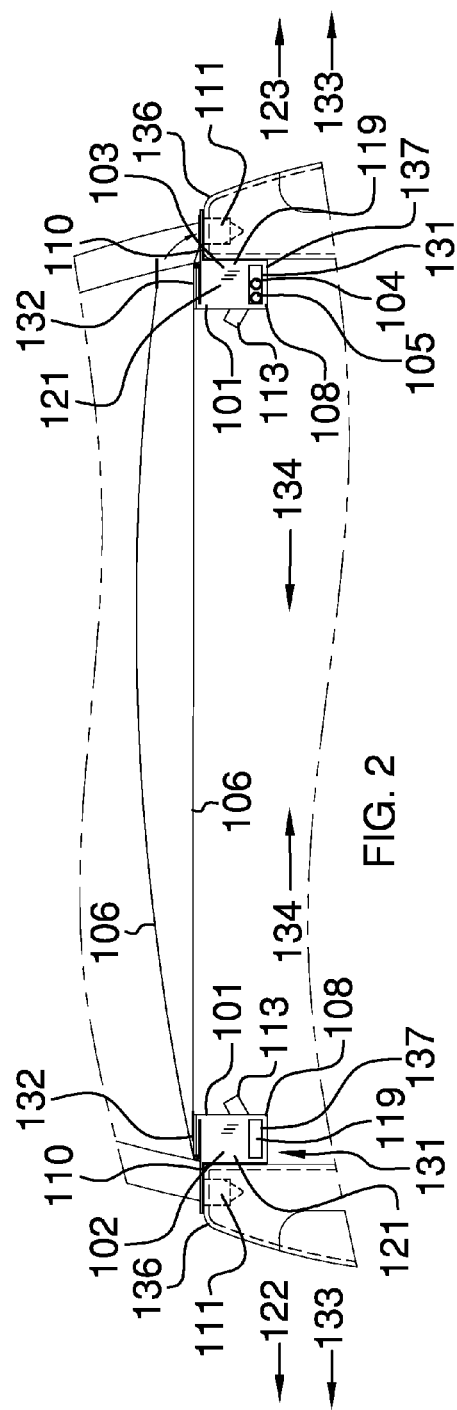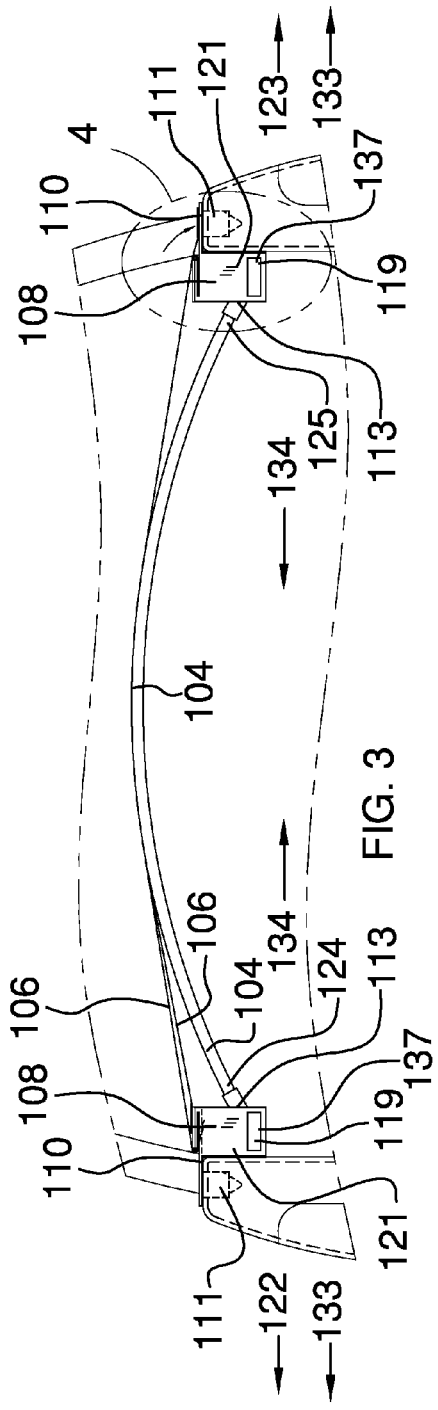

RETRACTABLE TARPAULIN FOR USE WITH A PICKUP TRUCK BED

CROSS REFERENCES TO RELATED APPLICATIONS

Not Applicable

STATEMENT REGARDING FEDERALLY SPONSORED RESEARCH

Not Applicable

REFERENCE TO APPENDIX

Not Applicable

BACKGROUND OF THE INVENTION

Field of the Invention

The present invention relates to the field of automobiles and automotive accessories, more specifically, a retractable tarpaulin configured for use in pickup trucks.

SUMMARY OF INVENTION

The retractable tarpaulin for use with a pickup truck is an aramid fiber tarpaulin that can be used to protect the bed, shelter large loads, or provide a visible space for advertisements and other messages. The aramid fiber tarpaulin is set up and secured using magnets. The retractable tarpaulin for use with a pickup truck comprises a plurality of rail assemblies and two flexible rods.

These together with additional objects, features and advantages of the retractable tarpaulin for use with a pickup truck will be readily apparent to those of ordinary skill in the art upon reading the following detailed description of the presently preferred, but nonetheless illustrative, embodiments when taken in conjunction with the accompanying drawings.

In this respect, before explaining the current embodiments of the retractable tarpaulin for use with a pickup truck in detail, it is to be understood that the retractable tarpaulin for use with a pickup truck is not limited in its applications to the details of construction and arrangements of the components set forth in the following description or illustration. Those skilled in the art will appreciate that the concept of this disclosure may be readily utilized as a basis for the design of other structures, methods, and systems for carrying out the several purposes of the retractable tarpaulin for use with a pickup truck.

It is therefore important that the claims be regarded as including such equivalent construction insofar as they do not depart from the spirit and scope of the retractable tarpaulin for use with a pickup truck. It is also to be understood that the phraseology and terminology employed herein are for purposes of description and should not be regarded as limiting.

BRIEF DESCRIPTION OF DRAWINGS

The accompanying drawings, which are included to provide a further understanding of the invention are incorporated in and constitute a part of this specification, illustrate an embodiment of the invention and together with the description serve to explain the principles of the invention. They are meant to be exemplary illustrations provided to enable persons skilled in the art to practice the disclosure and are not intended to limit the scope of the appended claims.

FIG. 2 is an in-use view of an embodiment of the disclosure.

FIG. 3 is an alternative in-use view of an embodiment of the disclosure.

DETAILED DESCRIPTION OF THE EMBODIMENT

Figure 1:
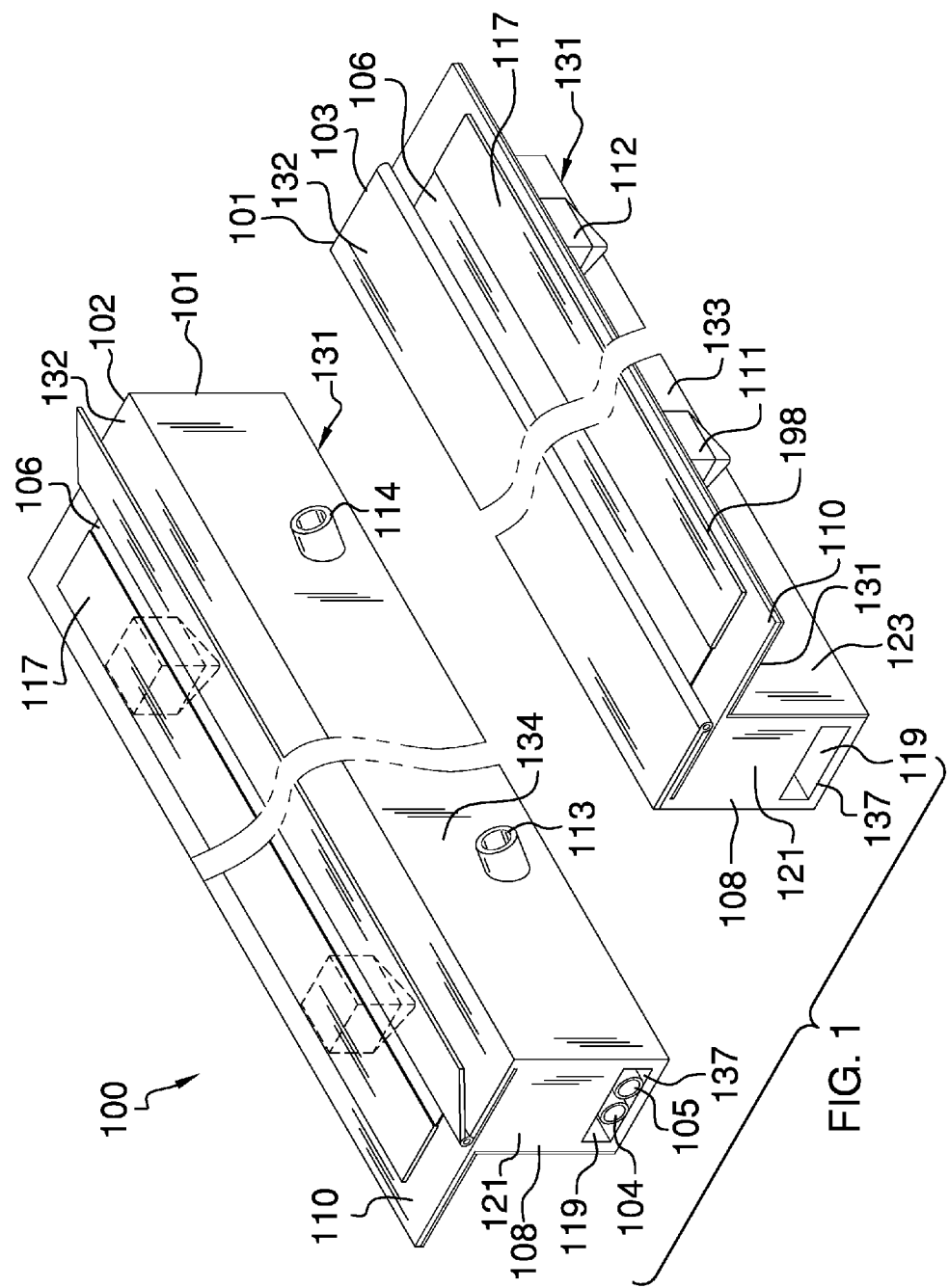
FIG. 1 is a perspective view of an embodiment of the disclosure.

The following detailed description is merely exemplary in nature and is not intended to limit the described embodiments of the application and uses of the described embodiments. As used herein, the word "exemplary" or "illustrative" means "serving as an example, instance, or illustration." Any implementation described herein as "exemplary" or "illustrative" is not necessarily to be construed as preferred or advantageous over other implementations. All of the implementations described below are exemplary implementations provided to enable persons skilled in the art to practice the disclosure and are not intended to limit the scope of the appended claims. Furthermore, there is no intention to be bound by any expressed or implied theory presented in the preceding technical field, background, brief summary or the following detailed description.

In the specification and claims, the following definitions and directional references will be used:

Tarpaulin: As used in this disclosure, a tarpaulin 106 is a protective covering made of a sheeting. The sheeting can be a textile material made from made from fibers or yarns suitable for textile production methods including, but not limited to, weaving, knitting or felting. The sheeting can also be made of material in the form of a continuous film including, but not limited to, plastic films.

The Following Directional References Will Be Used: The end of the pickup truck 118 that leads the pickup truck 118 in the normal driving direction is the front 120. The end of the pickup truck 118 distal from the front 120 is the rear 121. When a viewer is sitting in a cab 199 of the pickup truck 118 facing the front 120 end, the side of the pickup truck 118 on the left side of the viewer is the left 122 side of the pickup truck 118. When a viewer is sitting in the cab 199 of the pickup truck 118 facing the front 120 end, the side of the pickup truck 118 on the right side of the viewer is the right 123 side of the pickup truck 118. The face of the pickup truck 118 on which the wheels are mounted is the bottom 131 side of the pickup truck 118. The remaining side of the pickup truck 118 is the top 132 of the pickup truck 118.

Directional references of the invention 100 or of the components of the pickup truck 118 are related to the above directional references as follows: 1) the side or edge of a component of the invention 100 takes the name of the directional reference of the pickup truck 118 that it faces; and 2) the side or edge of a component of the pickup truck 118 takes the name of the directional reference of the pickup truck 118 that it faces.

Two other directions are also defined. When the retractable tarpaulin 106 is installed in the pickup truck 118, the top rail support 110 will project away from the housing 108 in the outside 133 direction. The direction opposite to the outside 133 direction will be the inside 133 direction.

Figure 4:
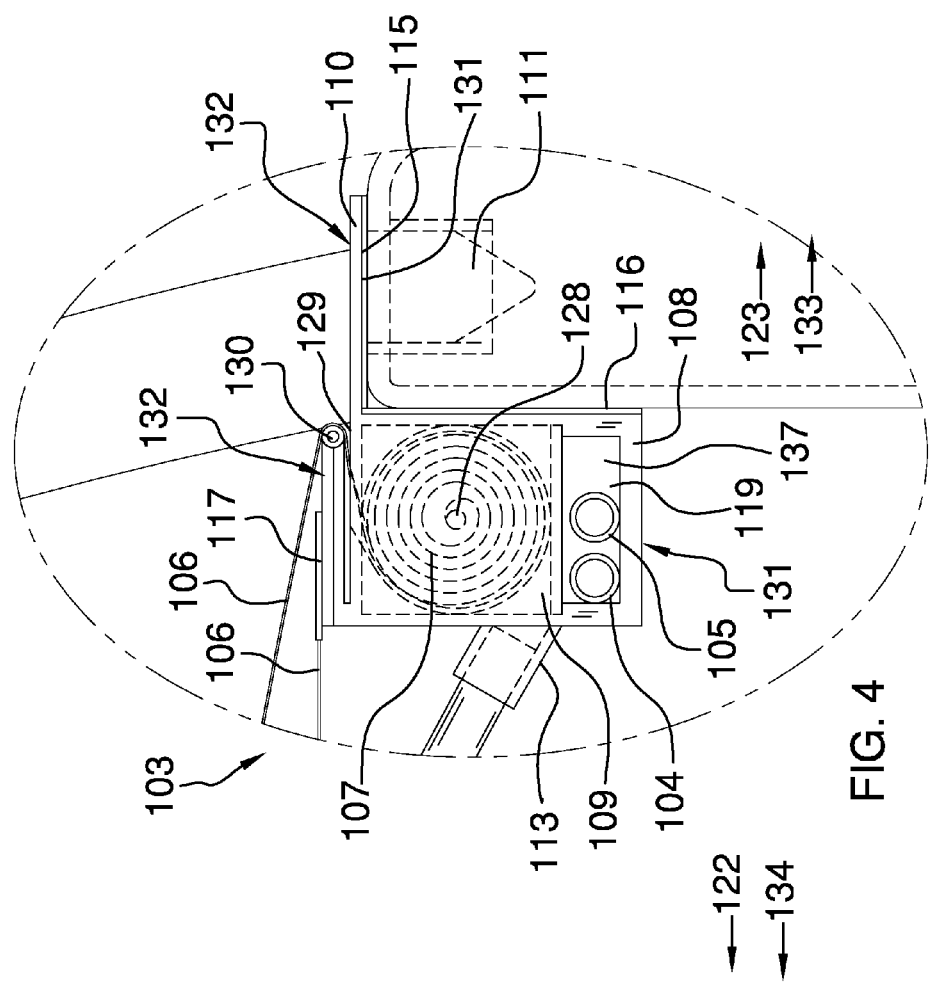
FIG. 4 is a detail view of an embodiment of the disclosure.
Figure 5:
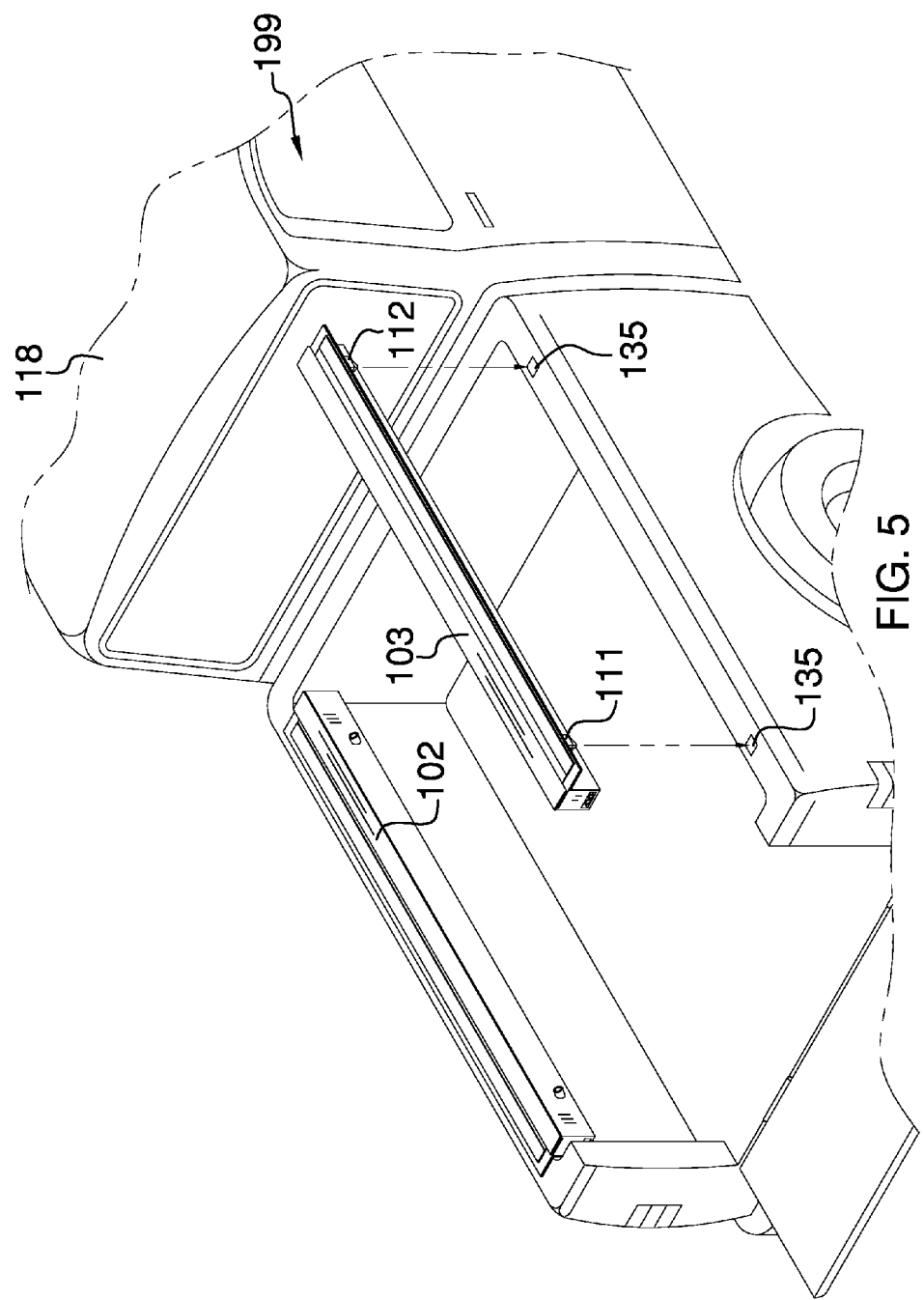
FIG. 5 is an exploded view of an embodiment of the disclosure.

Detailed reference will now be made to a first potential embodiment of the disclosure, which is illustrated in FIGS. 1 through 5. The retractable tarpaulin for use with a pickup truck 100 (hereinafter invention) comprises a plurality of rail assemblies 101, a first flexible rod 104 and a second flexible rod 105. Each of plurality of rail assemblies 101 comprises a tarpaulin 106, a retracting spool 107 and a housing 108.

The tarpaulin 106 is a tarpaulin made from a textile material or from a continuous film. Appropriate textile materials include, but are not limited to, textile materials made from polyamide, polyester, or aramid fibers or yarns. Appropriate continuous films include, but are not limited to, vinyl. A tarpaulin made of aramid fibers is preferred. The tarpaulin 106 is fitted with a plurality of magnetic strips 117 on a first edge 198. The purpose of the plurality of magnetic strips 117 is to hold the first edge 198 of the tarpaulin 106 in place when the tarpaulin 106 is in use by magnetically attaching the first edge 198 of the tarpaulin 106 to the pickup truck 118 or one of the plurality of rail assemblies 101.

When not in use, the tarpaulin 106 is stored on a retracting spool 107. The retracting spool 107 comprises a cylinder 128 upon which the tarpaulin 106 can be wound. The cylinder 128 may be spring-loaded so as to automatically wind the tarpaulin 106 thereon.

The housing 108 comprises a spool containment area 109, a top rail support 110, a first spring clip 111, a second spring clip 112, a first flexible rod mount 113, a second flexible rod mount 114, a first rubber pad 115 and a second rubber pad 116, and a rod storage space 119.

The housing 108 is roughly in the shape of a rectangular block with a panel that projects from one of the faces of the rectangular block. The interior of the rectangular block houses the spool containment area 109 and the rod storage space 119. On the exterior of the housing 108 is formed or mounted the first spring clip 111, the second spring clip 112, the first flexible rod mount 113, second flexible rod mount 114, first rubber pad 115, and second rubber pad 116.

The spool containment area 109 houses the retracting spool 107. The retracting spool 107 is mounted in the spool containment area 109 using standard hardware components. The top 132 of the housing 108 contains a first opening 129 and a roller 130 configured to allow the tarpaulin 106 to enter and exit the spool containment area 109 as the tarpaulin 106 is wound and unwound on the retracting spool 107. The tarpaulin 106 exits the first opening 129 and then, changes direction by wrapping around the roller 130. The roller 130 rotates to facilitate the movement of the tarpaulin 106.

The rod storage space 119 is space dedicated to storing the first flexible rod 104 and the second flexible rod 105. The rod storage space 119 is located at the bottom 131 of the housing 108, underneath the spool containment area 109. Access is provided through a second opening 137 located in the rear 121 face of the housing 108.

The top rail support 110 is a panel that is an extension of the plane of the top 132 face of the housing 108. The first spring clip 111 and second spring clip 112 are mounted on the bottom 131 of the top rail support 110. The purpose of the first spring clip 111 and the second spring clip 112 is to secure the housing 108 to the pickup truck 118 by inserting the first spring clip 111 and the second spring clip 112 into the bed stake holes 135 located in the top 132 rail of the pickup truck bed 136. The first spring clip 111 and the second spring clip 112 are each spring-loaded so as to secure the first spring clip 111 and the second spring clip 112 in the bed stake holes 135.

The first flexible rod mount 113 and second flexible rod mounts 114 are tubes that extend from the inside 133 face of the housing 108. Their purpose is to receive and securely hold the first flexible rod 104 and the second flexible rod 105 when they are being used.

The first rubber pad 115 and the second rubber pad 116 protect the finish of the pickup truck 118 from abrasion damage by the housing 108. The first rubber pad 115 is mounted on the bottom 131 face of the top rail support 110 and protects the top 132 rail of the pickup truck bed 136. The second rubber pad 116 is mounted on the outside 133 face of the housing 108.

The purpose of the first flexible rod 104 and the second flexible rod 105 is to act as rafters that raise the tarpaulin 106. The purpose of raising the tarpaulin 106 is to increase the volume of space protected by the tarpaulin 106 and to allow for water to drain off of the tarpaulin 106 during rainfall.

The first flexible rod 104 and the second flexible rod 105 are formed in the shape of a pipe. The pipe is made of a material that allows the pipe to bend under stress. The first flexible rod 104 has a first end 124 and a second end 125. The second flexible rod 105 has a third end 126 and fourth end 127. The outer diameter of the first flexible rod 104 and the second flexible rod 105 is sized so that the ends of the first flexible rod 104 and the second flexible rod 105 can be inserted into the first flexible rod mount 113 and the second flexible rod mount 114 of both the left rail assembly 102 and the right rail assembly 103.

To install the first flexible rod 104 and the second flexible rod 105: 1) the first end 124 is inserted into the first flexible rod mount 113 of the left rail assembly 102; 2) the second end 125 is inserted into the first flexible rod mount 113 of the right rail assembly 103; 3) the third end 126 is inserted into the second flexible rod mount 114 of the left rail assembly 102; and, 2) the fourth end 127 is inserted into the second flexible rod mount 114 of the right rail assembly 103.

The tarpaulin 106, retracting spool 107, roller 130, first flexible rod 104, second flexible rod 105, the first rubber pad 115 and second rubber pad 116 are commercially availalble.

The remaining components of the housing 108 can be made of a magnetic metal. The housing 108 is made with a removable face to provide access to the spool containment area 109 for assembly and maintenance purposes. Methods to attach the removable face include, but are not limited to, hinges or latches. Suitable metals include, but are not limited to, sheet metal.

To use the invention 100, the left rail assembly 102 is attached to the pickup truck 118 by inserting the first spring clip 111 and second spring clip 112 of the left rail assembly 102 into the into the bed stake holes 135 located in the left 122 and top 132 rail of the pickup truck bed 136. The right rail assembly 103 is then attached to the pickup truck 118 by inserting the first spring clip 111 and second spring clip 112 of the right rail assembly 103 into the into the bed stake holes 135 located in the right 123 and top 132 rail of the pickup truck bed 136. The tarpaulin 106 of the left rail assembly 102 can then be withdrawn off the retracting spool 107 and, using the plurality of magnetic strips 117, the tarpaulin 106 can be attached directly to the pickup truck or to the right rail assembly 103. The tarpaulin 106 of the right rail assembly 103 can then be withdrawn off the retracting spool 107 and, using the plurality of magnetic strips 117, the tarpaulin 106 can be attached directly to the pickup truck or to the left rail assembly 102.

With respect to the above description, it is to be realized that the optimum dimensional relationship for the various components of the invention described above and in FIGS. 1 through 5, include variations in size, materials, shape, form, function, and manner of operation, assembly and use, are deemed readily apparent and obvious to one skilled in the art, and all equivalent relationships to those illustrated in the drawings and described in the specification are intended to be encompassed by the invention.

Is shall be noted that those skilled in the art will readily recognize numerous adaptations and modifications which can be made to the various embodiments of the present invention which will result in an improved invention, yet all of which will fall within the spirit and scope of the present invention as defined in the following claims. Accordingly, the invention is to be limited only by the scope of the following claims and their equivalents.

The inventor claims:

1. A retractable tarpaulin adapted for use with a pickup truck comprising:
   a plurality of rail assemblies, a first flexible rod, and a second flexible rod;
   wherein the plurality of rail assemblies are adapted to be mounted onto a bed of said pickup truck;
   a tarpaulin is able to extend across the rail assemblies, and is supported via the first flexible rod and the second flexible rod;
   wherein the tarpaulin is stored on a retracting spool;
      wherein the retracting spool is further defined with a cylinder upon which the tarpaulin is wound;
   wherein a housing includes a spool containment area, a top rail support, a first spring clip, a second spring clip, a first flexible rod mount, a second flexible rod mount, a first rubber pad and a second rubber pad, and a rod storage space;
   wherein the first spring clip and second spring clip are mounted on the bottom of the top rail support and are adapted to be used to secure the housing to the pickup truck by inserting the first spring clip and the second spring clip into the bed stake holes located in a top rail of said bed of said pickup truck;
   wherein the first flexible rod mount and second flexible rod mount are tubes that extend from an inside face of the housing and receive and secure the first flexible rod as well as the second flexible rod.

2. The retractable tarpaulin for use with a pickup truck according to claim 1 wherein the first rubber pad and the second rubber pad are adapted to interface between the housing and a finish of the pickup truck in order to protect said finish from abrasion during use.

3. The retractable tarpaulin for use with a pickup truck according to claim 2 wherein the first flexible rod and the second flexible rod are rafters that raise and support the tarpaulin across said bed of said pickup truck.

4. The retractable tarpaulin for use with a pickup truck according to claim 3 wherein the tarpaulin includes at least one magnetic strip on a first edge; wherein the at least one magnetic strip is adapted to hold the first edge of the tarpaulin in place with respect to the pickup truck or to one of the plurality of rail assemblies.

5. The retractable tarpaulin for use with a pickup truck according to claim 4 wherein the housing includes the spool containment area, which includes the retracting spool; wherein a top of the housing includes a first opening and a roller that allow the tarpaulin to enter and exit the spool containment area as the tarpaulin is wound and unwound on the retracting spool; wherein the tarpaulin exits the first opening and then, changes direction by wrapping around the roller; wherein the roller rotates to facilitate the movement of the tarpaulin.

6. The retractable tarpaulin for use with a pickup truck according to claim 5 wherein the rod storage space is located in the housing; wherein the rod storage space is used to store the first flexible rod and the second flexible rod when not in use with supporting the tarpaulin.

7. The retractable tarpaulin for use with a pickup truck according to claim 6 wherein the rod storage space is located at a bottom of the housing; wherein the rod storage space is located underneath the spool containment area; wherein access to the rod storage spaces is provided through a second opening located in the rear face of the housing.

8. The retractable tarpaulin for use with a pickup truck according to claim 7 wherein the first flexible rod has a first end and a second end; wherein the second flexible rod has a third end and fourth end; wherein the outer diameter of the first flexible rod and the second flexible rod is sized so that the ends of the first flexible rod and the second flexible rod are able to be inserted into the first flexible rod mount and the second flexible rod mount of both the left rail assembly and the right rail assembly.

9. A retractable tarpaulin adapted for use with a pickup truck comprising:
   a plurality of rail assemblies, a first flexible rod, and a second flexible rod;
   wherein the plurality of rail assemblies are adapted to be mounted onto a bed of said pickup truck;
   a tarpaulin is able to extend across the rail assemblies, and is supported via the first flexible rod and the second flexible rod;
   wherein the tarpaulin is stored on a retracting spool;
      wherein the retracting spool is further defined with a cylinder upon which the tarpaulin is wound;
   wherein a housing includes a spool containment area, a top rail support, a first spring clip, a second spring clip, a first flexible rod mount, a second flexible rod mount, a first rubber pad and a second rubber pad, and a rod storage space;
   wherein the first spring clip and second spring clip are mounted on the bottom of the top rail support and are adapted to be used to secure the housing to the pickup truck by inserting the first spring clip and the second spring clip into the bed stake holes located in a top rail of said bed of said pickup truck;
   wherein the first flexible rod mount and second flexible rod mount are tubes that extend from an inside face of the housing and receive and secure the first flexible rod as well as the second flexible rod; wherein the first rubber pad and the second rubber pad are adapted to interface between the housing and a finish of the pickup truck in order to protect said finish from abrasion during use.

10. The retractable tarpaulin for use with a pickup truck according to claim 9 wherein the first flexible rod and the second flexible rod are rafters that raise and support the tarpaulin across said bed of said pickup truck; wherein the tarpaulin includes at least one magnetic strip on a first edge; wherein the at least one magnetic strip is adapted to hold the first edge of the tarpaulin in place with respect to the pickup truck or to one of the plurality of rail assemblies.

11. The retractable tarpaulin for use with a pickup truck according to claim 10 wherein the housing includes the spool containment area, which includes the retracting spool; wherein a top of the housing includes a first opening and a roller that allow the tarpaulin to enter and exit the spool containment area as the tarpaulin is wound and unwound on the retracting spool; wherein the tarpaulin exits the first opening and then, changes direction by wrapping around the roller; wherein the roller rotates to facilitate the movement of the tarpaulin.

12. The retractable tarpaulin for use with a pickup truck according to claim 11 wherein the rod storage space is located in the housing; wherein the rod storage space is used to store the first flexible rod and the second flexible rod when not in use with supporting the tarpaulin; wherein the rod storage space is located at a bottom of the housing; wherein the rod storage space is located underneath the spool containment area; wherein access to the rod storage spaces is provided through a second opening located in the rear face of the housing.

13. The retractable tarpaulin for use with a pickup truck according to claim 12 wherein the first flexible rod has a first end and a second end; wherein the second flexible rod has a third end and fourth end; wherein the outer diameter of the first flexible rod and the second flexible rod is sized so that the ends of the first flexible rod and the second flexible rod are able to be inserted into the first flexible rod mount and the second flexible rod mount of both the left rail assembly and the right rail assembly.

* * * * *